(12) United States Patent
Birnbaum et al.

(10) Patent No.: US 11,573,393 B2
(45) Date of Patent: Feb. 7, 2023

(54) CAMERA WITH BASE CUTOUT FOR POSITION SENSING ARRANGEMENT

(71) Applicant: Apple Inc., Cupertino, CA (US)

(72) Inventors: Zachary W. Birnbaum, Saratoga, CA (US); Nicholas D. Smyth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/244,761

(22) Filed: Apr. 29, 2021

(65) Prior Publication Data

US 2021/0341705 A1 Nov. 4, 2021

Related U.S. Application Data

(60) Provisional application No. 63/019,955, filed on May 4, 2020.

(51) Int. Cl.
*H04N 5/225* (2006.01)
*H04N 5/232* (2006.01)
(Continued)

(52) U.S. Cl.
CPC ............... *G02B 7/09* (2013.01); *G02B 7/021* (2013.01); *G02B 27/646* (2013.01); *G03B 5/00* (2013.01); *G03B 13/36* (2013.01); *G03B 30/00* (2021.01); *H04N 5/2254* (2013.01); *H04N 5/232* (2013.01); *G03B 2205/0007* (2013.01)

(58) Field of Classification Search
CPC ........ G02B 7/09; G02B 7/021; G02B 27/646; G02B 7/08; G03B 5/00; G03B 13/36; G03B 30/00; G03B 2205/0007; G03B 2205/0015; G03B 3/10; H04N 5/2254; H04N 5/232; H04N 5/23212; H04N 5/2253; H04N 5/2257; H04N 5/23287; H04N 5/2251
See application file for complete search history.

(56) References Cited

U.S. PATENT DOCUMENTS 8,131,141 B2 3/2012 Takei et al.
9,407,799 B2 8/2016 Kasamatsu
(Continued)

FOREIGN PATENT DOCUMENTS

JP 2012177753 A 9/2021

OTHER PUBLICATIONS

International Search Report and Written Opinion in International Application No. PCT/US2021/030060 dated Jul. 22, 2021, Apple Inc.

*Primary Examiner* — Padma Haliyur
(74) *Attorney, Agent, or Firm* — Robert C. Kowert; Kowert, Hood, Munyon, Rankin & Goetzel, P.C.

(57) ABSTRACT

Various embodiments include a camera having one or more base cutouts for a position sensing arrangement. For example, the position sensing arrangement may be used to determine a position of a moveable lens group and/or a moveable image sensor. According to some embodiments, a base structure of the camera may include a cutout that allows for a protrusion of a lens carrier to extend (e.g., in a direction parallel to an optical axis of the camera) past at least a portion of the base structure. A probe magnet may be attached to the protrusion of the lens carrier, and a position sensor for sensing magnetic fields of the probe magnet may be attached to the substrate.

20 Claims, 7 Drawing Sheets

(51) Int. Cl.
  G02B 7/09 (2021.01)
  G03B 30/00 (2021.01)
  G02B 27/64 (2006.01)
  G03B 13/36 (2021.01)
  G02B 7/02 (2021.01)
  G03B 5/00 (2021.01)

(56) References Cited

U.S. PATENT DOCUMENTS

| | | |
|---|---|---|
| 10,107,987 B2 | 10/2018 | Osaka et al. |
| 2010/0220402 A1* | 9/2010 | Santo ................... G02B 7/102 |
| | | 359/823 |
| 2016/0073028 A1 | 3/2016 | Gleason et al. |
| 2017/0235094 A1* | 8/2017 | Osaka ................ H02K 41/0356 |
| | | 359/824 |
| 2017/0363839 A1* | 12/2017 | Sato ........................ H04N 5/232 |
| 2019/0020822 A1* | 1/2019 | Sharma ................ H04N 5/2253 |
| 2019/0320119 A1 | 10/2019 | Miyoshi |
| 2020/0106962 A1 | 4/2020 | Smyth et al. |

* cited by examiner

CAMERA WITH BASE CUTOUT FOR POSITION SENSING ARRANGEMENT

This application claims benefit of priority to U.S. Provisional Application Ser. No. 63/019,955, entitled "Camera with Base Cutout for Position Sensing Arrangement," filed May 4, 2020, and which is incorporated herein by reference in its entirety.

BACKGROUND

Technical Field

This disclosure relates generally to architecture for a camera having one or more base cutouts for a position sensing arrangement.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 2A-2B illustrate views of another example camera having one or more base cutouts for a position sensing arrangement, in accordance with some embodiments. FIG. 2A shows a top view of the camera.

FIGS. 3A-3C illustrate views of yet another example camera having one or more base cutouts for a position sensing arrangement, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include a camera having camera having one or more base cutouts for a position sensing arrangement. For example, the position sensing arrangement may be used to determine a position of a moveable lens group and/or a moveable image sensor. According to some embodiments, a base structure of the camera may include a cutout that allows for a protrusion of a lens carrier to extend (e.g., in a direction parallel to an optical axis of the camera) past at least a portion of the base structure. A probe magnet may be attached to the protrusion of the lens carrier, and a position sensor for sensing magnetic fields of the probe magnet may be attached to the substrate. In various embodiments, the cutout(s) may enable a reduced gap, in the direction parallel to the optical axis, between the probe magnet and the position sensor, e.g., as compared to some other cameras that have a relatively large magnet to sensor gap due to one or more structures extending between the magnet and the sensor. In various embodiments, the reduced gap of the position sensing arrangement described herein may enable improved position sensing performance, e.g., by providing higher sensitivity and/or improved stray field rejection.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1:
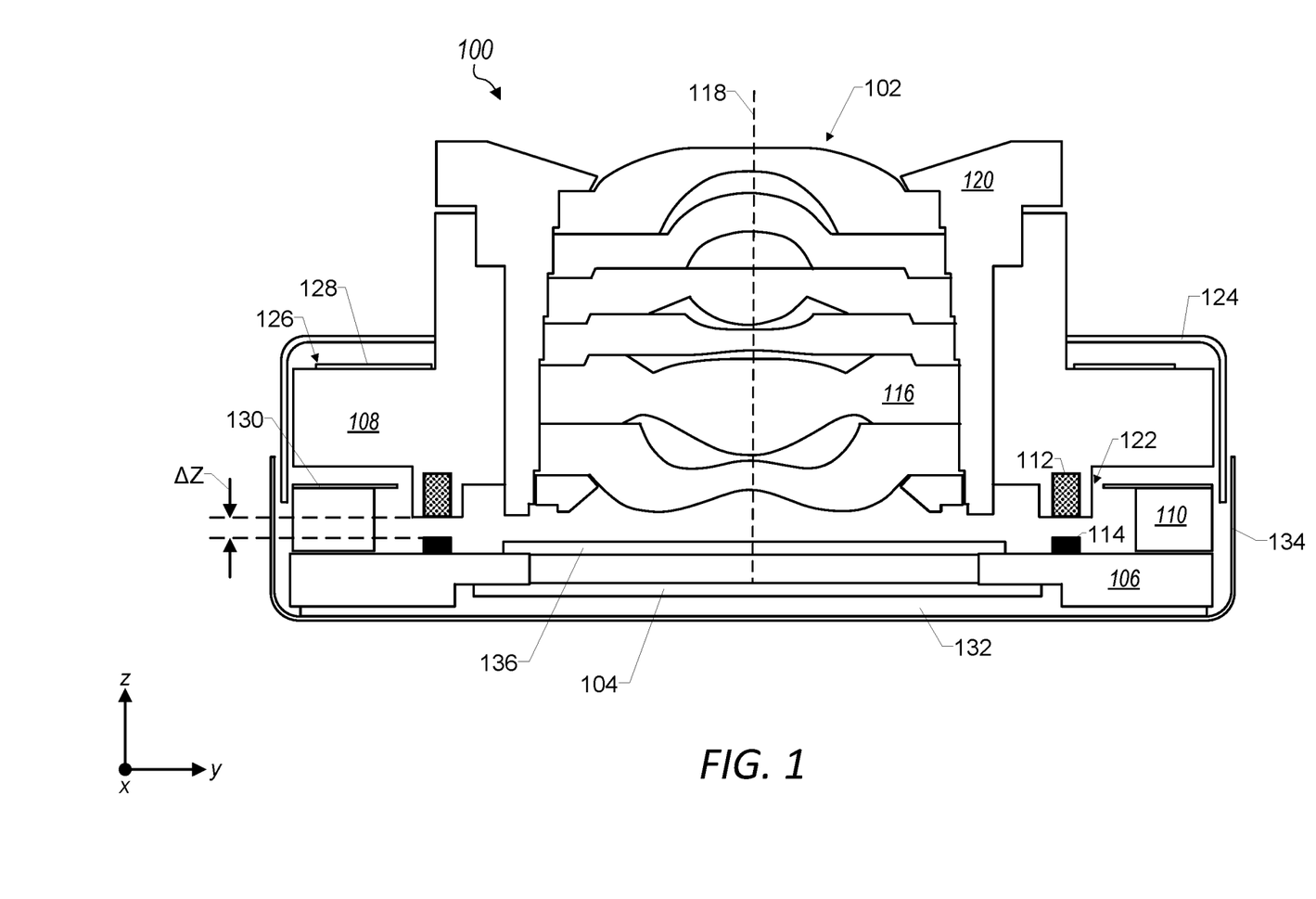
FIG. 1 illustrates a side cross-sectional view of an example camera having one or more base cutouts for a position sensing arrangement, in accordance with some embodiments.

FIG. 1 illustrates a side cross-sectional view of an example camera having one or more base cutouts for a position sensing arrangement. The example X-Y-Z coordinate system shown in FIG. 1 may apply to embodiments discussed throughout this disclosure.

In some embodiments, the camera 100 may include a lens group 102, an image sensor 104, an actuator (e.g., actuator 610 in FIG. 6), a substrate 106, a lens carrier 108, a base structure 110, and/or a position sensing arrangement (e.g., comprising one or more probe magnets 112 and one or more position sensors 114).

The lens group 102 may include one or more lens elements 116 that define an optical axis 118. The image sensor 104 may be configured to capture image data based on light that passes through the lens group 102. In some embodiments, the image sensor 104 may be attached to the substrate 106. In some embodiments, the lens group 102 may be coupled with the lens carrier 108. According to some examples, the lens group 102 may be contained within a lens barrel 120, and the lens barrel 120 may be fixedly attached to the lens carrier 108. The lens group 102 may be coupled with the lens carrier 108 such that the lens group 102 is moveable together (e.g., in lockstep) with the lens carrier 108, e.g., via the actuator.

According to various embodiments, the actuator may be configured to move the lens group 102 and/or the image sensor 104. For example, the actuator may move the lens group 102 relative to the image sensor 104. Additionally, or alternatively, the actuator may move the image sensor 104 relative to the lens group 102. In some embodiments, the actuator may move the lens group 102 and/or the image sensor 104 in a direction parallel to the optical axis 118, e.g., to provide autofocus (AF) functionality. Additionally, or alternatively, the actuator (and/or one or more other actuators of the camera 100) may move the lens group 102 and/or the image sensor 104 in one or more directions orthogonal to the optical axis 118, e.g., to provide optical image stabilization (OIS) functionality.

As previously mentioned, the position sensing arrangement may include one or more probe magnets 112 and one or more position sensors 114 (e.g., magnetic field sensors, such as Hall sensors, tunneling magnetoresistance (TMR) sensors, giant magnetoresistance (GMR) sensors, etc.). In some embodiments, the probe magnet(s) 112 may be attached to the lens carrier 108. Furthermore, the position sensor(s) 114 may be attached to the substrate 106 in some embodiments. According to various embodiments, the base structure 110 may comprise one or more cutouts (e.g., cutout 314 in FIG. 3B, cutouts 316c in FIG. 3C, cutout 314c' in FIG. 3C, cutout 510 in FIG. 5, etc.). For example, the base structure 110 may define a cutout that accommodates at least a portion of a protrusion 122 of the lens carrier 108. A probe magnet 112 may be attached to the protrusion 122 and located proximate the position sensor 114. In some embodiments, the protrusion may extend, in a direction parallel to the optical axis 118 (e.g., the Z-axis direction), past at least a portion of the base structure 110 via an open space provided by the cutout of the base structure 110. In some embodiments, the cutout(s) may enable a reduced gap (e.g., the gap Δz in FIG. 1), in the direction parallel to the optical axis 118 (e.g., the Z-axis direction) between the probe magnet 112 and the position sensor 114, e.g., as compared to some other cameras that have a relatively large magnet to sensor gap due to one or more structures extending between the magnet and the sensor, which may obstruct a path (e.g., in the Z-axis direction) that might otherwise allow for the magnet and the sensor to be placed closer together. In various embodiments, the reduced gap of the position sensing arrangement described herein may enable improved position sensing performance, e.g., by providing higher sensitivity and/or improved stray magnetic field rejection.

According to some embodiments, the camera 100 may include a shield can 124 that covers a portion of the camera 100. For example, the shield can 124 may be shaped to cover at least a top portion and one or more side portions of the camera 100. In some embodiments, the shield can 124 may include a top wall and one or more side walls. Furthermore, the shield can 124 may include one or more bend portions that interconnect the top wall with the side wall(s). In some examples, the bend portions may be formed by folding a sheet of material (e.g., sheet metal), e.g., into a shape configured to cover at least a portion of the actuator.

In various embodiments, the camera 100 may include a suspension arrangement 126 configured to suspend the lens carrier 108 from one or more stationary structures of the camera 100. For example, the suspension arrangement 126 may suspend the lens carrier 108 from the base structure 110 and/or one or more other stationary structures of the camera 100. Furthermore, the suspension arrangement 126 may allow controlled movement of the lens carrier 108 (e.g., in the direction parallel to the optical axis and/or the Z-axis direction) relative to the image sensor 104. As indicated in FIG. 1, and as also discussed herein with reference to FIGS. 2A-2B, the suspension arrangement 124 may include an upper leaf spring 128 and/or a lower leaf spring 130. In some embodiments, the camera 100 may include one or more spring mounting spacers (e.g., spring mounting spacer(s) 224 in FIG. 2B) used to mount a spring (e.g., the upper leaf spring 126) of the suspension arrangement 126. In some embodiments, such a spring mounting spacer may be positioned, in the Z-axis direction, between one or more outer walls (e.g., a top wall of the shield can 124) of the camera 100 and a leaf spring (e.g., the upper leaf spring 128) of the suspension arrangement 126. For example, the spring mounting spacer may be located adjacent to and/or proximate a side wall of the shield can 124, and the spring mounting spacer may be vertically sandwiched between the shield can 124 and the upper leaf spring 128. In various embodiments, the suspension arrangement 126 may additionally, or alternatively, include one or more other suspension components arranged differently (and/or of a different type) than the leaf springs shown in FIG. 1. For example, the suspension arrangement 126 may include a ball bearing suspension arrangement in some embodiments.

In various embodiments, the camera 100 may include a flex circuit 132 that may be configured to convey electrical signals (e.g., power and/or control signals). In some embodiments, the flex circuit 132 may be used to convey certain signals (e.g., signals associated with image data captured via the image sensor 104, signals associated with position sensor data captured via the position sensor(s) 114, etc.) to one or more components that are external to the camera 100, such as an image signal processor (ISP) of a device (e.g., device(s) described herein with reference to FIG. 6). The flex circuit 132 may convey such signals to the image sensor 104 via the substrate 106 in some examples. Furthermore, the flex circuit 132 may be used to convey control signals (e.g., signals associated with actuator commands from controller(s) of the ISP) to the coil(s) of the actuator. For example, the flex circuit 132 may convey control signals to the coil(s) via the substrate 106, the base structure 110, the suspension arrangement 126, and/or the lens carrier 108. In some embodiments, the camera 100 may include a stiffener 134 that includes a bottom wall disposed adjacent to a bottom surface of the flex circuit 132. The stiffener 134 may provide structural support to the flex circuit 132 and/or one or more other portions of the camera 100. According to some examples, the stiffener 134 may include one or more side walls (which also may be referred to as "tabs") that are interconnected with the bottom wall of the stiffener 134. In some embodiments, the tab(s) of the stiffener 134 may be folded up from the bottom wall of the stiffener 134, e.g., to at least partially establish one or more sides of the camera 100. As indicated in FIG. 1, in some embodiments a tab of the stiffener 134 may partially overlap with a corresponding side wall of the shield can 124, and the overlapping tab and side wall may form a side of the camera 100. Furthermore, the camera 100 may include one or more optical filters 136 (e.g., an infrared filter) coupled with the substrate 106 and positioned, in the Z-axis direction, between the lens group 102 and the image sensor 104.

Figure 2A:
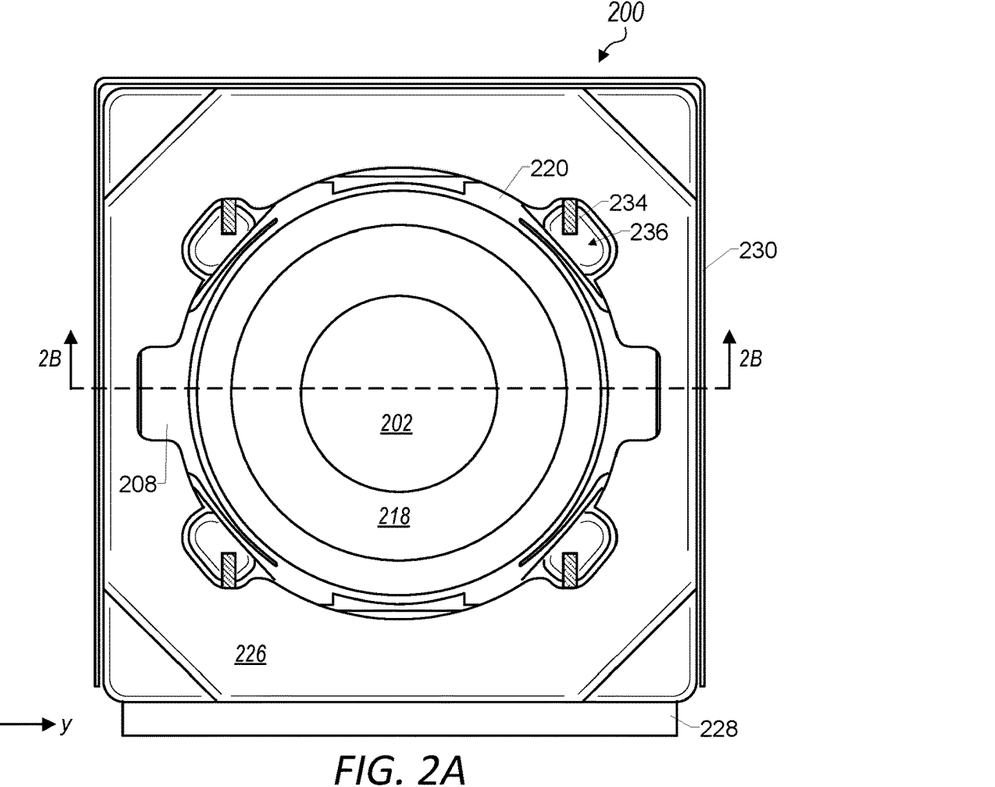
Figure 2B:
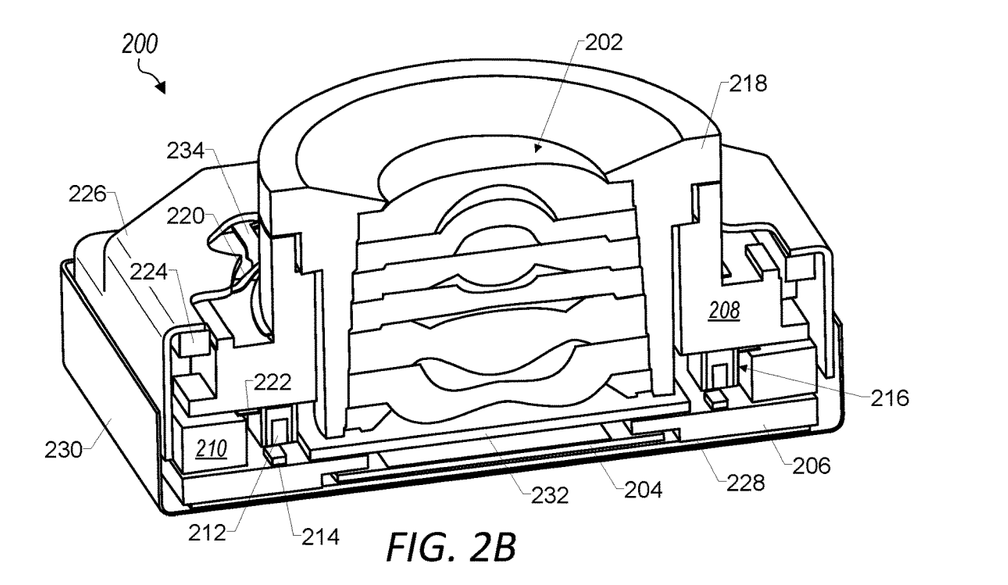
FIG. 2B shows a perspective cross-sectional view of the camera.

FIGS. 2A-2B illustrate views of another example camera 200 having one or more base cutouts for a position sensing arrangement. FIG. 2A shows a top view of the camera 200. FIG. 2B shows a perspective cross-sectional view of the camera 200. In some embodiments, the cross-sectional view shown in FIG. 2B may correspond to a cross section taken at a location indicated by section line 2B-2B in FIG. 2A.

In some embodiments, the camera 200 may include a lens group 202, an image sensor 204, an actuator (e.g., actuator 610 in FIG. 6), a substrate 206, a lens carrier 208, a base structure 210, and/or a position sensing arrangement (e.g., comprising one or more probe magnets 212 and one or more position sensors 214). According to various embodiments, the camera 200 may be the same as, or similar to, the camera 100 described herein with reference to FIG. 1. For example, the lens group 202, the image sensor 204, the substrate 206, the lens carrier 208, the base structure 210, and/or the position sensing arrangement comprising the probe magnet(s) 212 and the position sensor(s) 214, respectively, may be the same as, or similar to, the lens group 102, the image sensor 104, the substrate 106, the lens carrier 108, the base structure 110, and/or the position sensing arrangement comprising the probe magnet(s) 112 and the position sensor(s) 114.

According to various embodiments, the base structure 210 may be positioned, in a direction parallel to an optical axis (e.g., optical axis 118 in FIG. 1 and/or the Z-axis direction), between at least a portion of the lens group 202 and the substrate 206. For example, the base structure 210 may be attached to an upper surface of the substrate 206. In some embodiments, the probe magnet(s) 212 may be attached to the lens carrier 208. Furthermore, the position sensor(s) 214 may be attached to the substrate 206. In various embodiments, the base structure 210 may comprise one or more cutouts (e.g., cutout 314 in FIG. 3B, cutouts 316c in FIG. 3C, cutout 314c' in FIG. 3C, cutout 510 in FIG. 5, etc.). In various embodiments, a cutout may be an opening through the base structure 210. For example, the base structure 210 may define a cutout that accommodates at least a portion of a protrusion 216 of the lens carrier 208. In some embodiments, the cutout may also serve as the same opening through which light passes to reach the image sensor 204. In some embodiments, the cutout may be an opening that includes an inner opening portion and one or more outer opening portions. The inner opening portion may be configured to allow light to reach the image sensor 204. The outer opening portion(s) may be configured to accommodate the protrusion(s) 216 and/or the probe magnet(s) 212, and may extend outward (e.g., in a direction orthogonal to and away from the optical axis) from the inner opening portion towards a respective side wall of the camera 200. A probe magnet 212 may be attached to the protrusion 216 and located proximate a position sensor 214. For example, the probe magnet 212 and the position sensor 214 may be positioned along an axis that extends through the cutout in the direction parallel to the optical axis (e.g., the Z-axis direction). In some embodiments, the protrusion 216 may extend, in the direction parallel to the optical axis, past at least a portion of the base structure 210 via the cutout of the base structure 210. Furthermore, the probe magnet 212 and the protrusion 216 may be positioned, in a direction orthogonal to the optical axis (e.g., the Y-axis direction), between the lens group 202 and the base structure 210. As discussed above, the cutout(s) may enable a reduced gap (e.g., the gap $\Delta z$ in FIG. 1), in the direction parallel to the optical axis (e.g., the Z-axis direction) between the probe magnet 212 and the position sensor 214.

In some embodiments, the actuator may be configured to move the lens carrier 208, in a direction parallel to the optical axis (e.g., in the Z-axis direction), relative to the image sensor 204. The lens carrier 208 may be fixedly coupled with the lens group 202. For example, the camera 200 may include a lens barrel 218 that contains the lens group 202, and the lens carrier 208 may be fixedly attached to the lens barrel 218 such that the lens carrier 208 is moveable together (e.g., in lockstep) with the lens group 202 via the actuator. The probe magnet 212 may be fixedly attached to the protrusion 216 such that the probe magnet 212 is moveable together with the lens carrier 208 and the lens group 202 via the actuator, e.g., within a range of motion. In various embodiments, the range of motion of the probe magnet 212 may include a path, in the direction parallel to the optical axis (e.g., in the Z-axis direction) and via the cutout, for positioning at least a portion of the probe magnet 212 between an upper surface of the base structure 210 and an upper surface of the substrate 206. In some embodiments, the cutout may enable the camera 200 to be configured such that a maximum actuator stroke towards the image sensor 204 (and/or the substrate 206) may move the probe magnet 212 to a lowest position at which a bottom surface of the probe magnet 212 nearly touches a top surface of the position sensor 214. For example, at the lowest position, there may be a minimal amount of separation, in the Z-axis direction, between the probe magnet 212 and the position sensor 214. The minimal amount of separation may be determined based at least in part on design constraints, requirements, and/or tolerances in various examples.

In various embodiments, the cutout of the base structure 210 may comprise multiple outer opening portions. For example, the base structure 210 may define a first outer opening portion that extends, in a direction orthogonal to the optical axis (e.g., the Y-axis direction), between the inner opening portion and a first side wall of the camera 200. Furthermore, the base structure 210 may define a second outer opening portion that extends, in the direction orthogonal to the optical axis (e.g., the Y-axis direction), between the inner opening portion and a second side wall of the camera 200. As indicated in FIG. 2B, for example, the second side wall may be opposite the first side wall relative to the lens group 202.

In various embodiments, the camera 200 may include a suspension arrangement (e.g., suspension arrangement 126 in FIG. 1) configured to suspend the lens carrier 208 from one or more stationary structures of the camera 200. For example, the suspension arrangement may suspend the lens carrier 208 from the base structure 210 and/or one or more other stationary structures of the camera 200. Furthermore, the suspension arrangement may allow controlled movement of the lens carrier 208 (e.g., in the direction parallel to the optical axis and/or the Z-axis direction) relative to the image sensor 204. In some embodiments, the suspension arrangement may include one or more upper leaf springs 220 and/or one or more lower leaf springs 222. In some embodiments, the camera 200 may include one or more spring mounting spacers 224 used to mount one or more springs (e.g., the upper leaf spring(s) 220) of the suspension arrangement. In some embodiments, a spring mounting spacer 224 may be positioned, in the Z-axis direction, between one or more outer walls (e.g., a top wall of the shield can 226) of the camera 200 and a leaf spring (e.g., the upper leaf spring 220) of the suspension arrangement. For example, the spring mounting spacer 224 may be located adjacent to and/or proximate a side wall of the shield can 226, and the spring mounting spacer 224 may be vertically sandwiched between the shield can 226 and the upper leaf spring 220.

In some embodiments, an upper leaf spring 220 may extend, along a first plane that is orthogonal to the optical axis (e.g., a plane that is parallel to the X-Y plane), from the lens carrier 208 to one or more stationary structures (e.g., the spring mounting spacer 224) of the camera 200. Additionally, or alternatively, a lower leaf spring 222 may extend, along a second plane that is orthogonal to the optical axis, from the lens carrier 208 to the base structure 210. The lower leaf spring 222 may be positioned between the first plane and the substrate 206 in some examples.

In various embodiments, the camera 200 may include a flex circuit 228 that may be configured to convey electrical signals (e.g., power and/or control signals), e.g., as discussed herein with reference to flex circuit 132 in FIG. 1. In some embodiments, the camera 200 may include a stiffener 230 that includes a bottom wall disposed adjacent to a bottom surface of the flex circuit 228. The stiffener 230 may provide structural support to the flex circuit 228 and/or one or more other portions of the camera 200. According to some examples, the stiffener 230 may include one or more side walls (which also may be referred to as "tabs") that are interconnected with the bottom wall of the stiffener 230. As also discussed herein with reference to stiffener 134 in FIG. 1, the tab(s) of the stiffener 230 may be folded up from the bottom wall of the stiffener 230, e.g., to at least partially establish one or more sides of the camera 200. As indicated in FIGS. 2A-2B, in some embodiments each tab of the stiffener 230 may partially overlap with a respective side wall of the shield can 226, and the overlapping tab and side wall may form a side of the camera 200. In some embodiments, the stiffener 230 may not have such a tab one or more sides of the camera 200, e.g., as indicated in FIG. 2A, the stiffener 230 may not include a tab at the side from which the flex circuit 228 extends outwardly from the camera 200. Furthermore, in some embodiments, the camera 200 may include one or more optical filters 232 (e.g., an infrared filter) coupled with the substrate 206 and positioned, in the Z-axis direction, between the lens group 202 and the image sensor 204.

In some embodiments, the camera 200 may include one or more damper arrangements configured to dampen motion of a dynamic component (e.g., the lens carrier 208). According to some embodiments, the damper arrangement may include one or more interface members 234 and one or more pockets 236. For example, an interface member 234 may extend from one or more stationary structures (e.g., the shield can 230) to at least partially into a viscoelastic material contained within the pocket 236, e.g., as indicated in FIG. 2A. According to some embodiments, the interface member 234 may be attached to an inner surface of a top wall of the shield can 230. In some embodiments, the pocket(s) 236 may be defined by the lens carrier 208. The interface member(s) 234 may be configured to traverse within the viscoelastic material in corresponding pocket(s) 236 to dampen motion of the lens carrier 208, e.g., during operation of the actuator to move the lens carrier 208 in the direction parallel to the optical axis (e.g., the Z-axis direction).

Figure 3A:
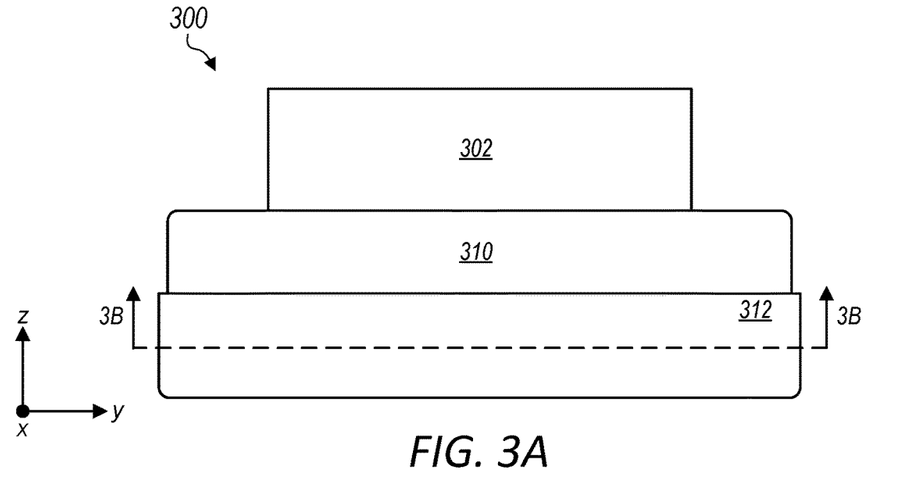
FIG. 3A shows a schematic side view of the camera.
Figure 3B:
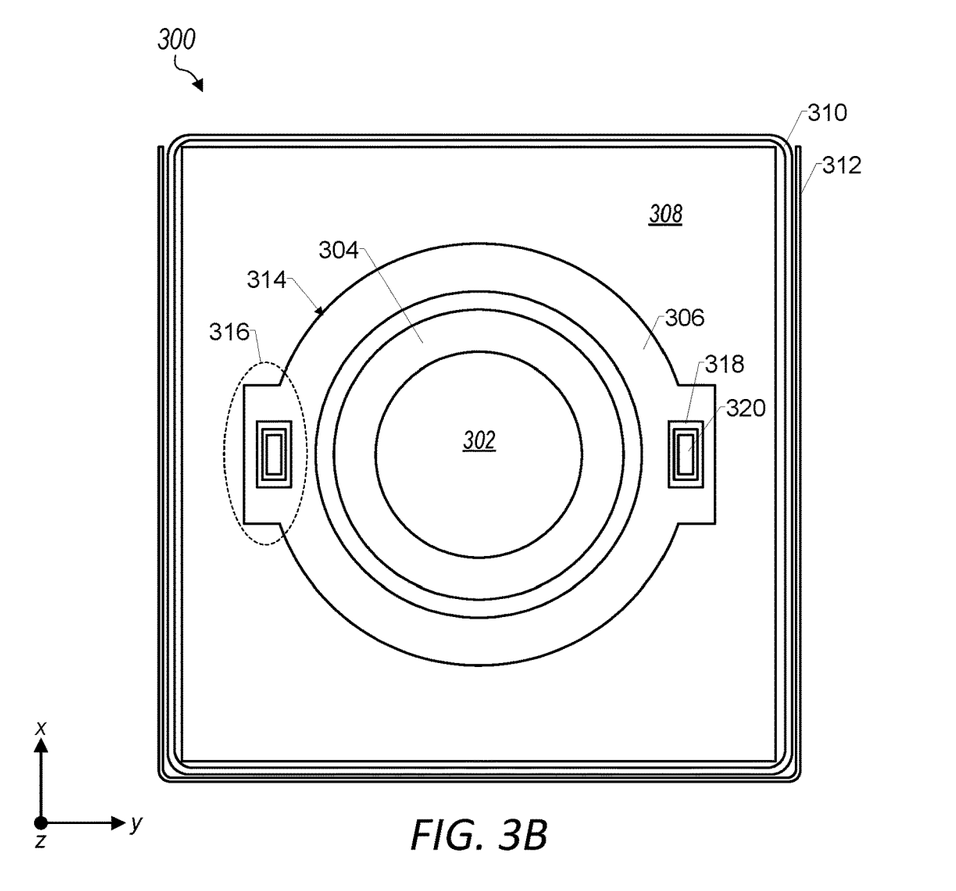
FIG. 3B shows a bottom cross-sectional view of the camera including an example base cutout arrangement.
Figure 3C:
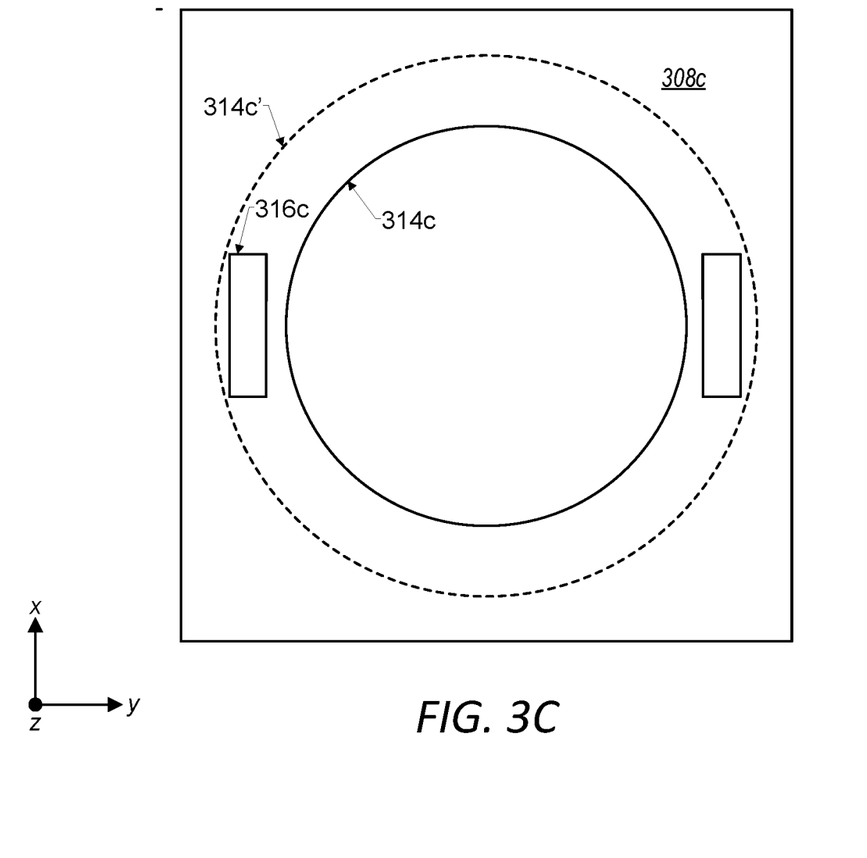
FIG. 3C shows a schematic bottom view of the camera with another example base cutout arrangement.

FIGS. 3A-3C illustrate views of yet another example camera 300 having one or more base cutouts for a position sensing arrangement. FIG. 3A shows a schematic side view of the camera 300. FIG. 3B shows a bottom cross-sectional view of the camera 300 including an example base cutout arrangement. In some embodiments, the cross-sectional view shown in FIG. 3B may correspond to a cross section taken at a location indicated by section line 3B-3B in FIG. 3A. FIG. 3C shows a schematic bottom view of the camera with another example base cutout arrangement (e.g., different from the base cutout arrangement shown in FIG. 3B).

In some embodiments, the camera 300 may include a lens group 302, a lens barrel 304, a lens carrier 306, a base structure 308, a shield can 310, and/or a stiffener 312. According to various embodiments, the camera 300 may be the same as, or similar to, the camera 100 and/or the camera 200 described herein with reference to FIGS. 1-2B. For example, the lens group 302, the lens barrel 304, the lens carrier 306, the base structure 308, the shield can 310, and/or the stiffener 312, respectively, may be the same as, or similar to, the lens group 102, the lens barrel 120, the lens carrier 108, the base structure 110, the shield can 124, and/or the stiffener 134 of FIG. 1.

As indicated in FIG. 3B, the base structure 308 may define a cutout 314 comprising an inner opening portion and one or more outer opening portions 316 that collectively form an opening. The inner opening portion may be configured to allow light to reach the image sensor (e.g., image sensor 104 in FIG. 1). Each of the outer opening portion(s) 316 may be sized to receive at least a portion of a respective protrusion 318 of the lens carrier 306 and/or at least a portion of a respective probe magnet 320 (which may be attached to the respective protrusion 318). In various embodiments, an outer opening portion 316 of the cutout 314 may at least partially encircle a protrusion 318 and/or a probe magnet 320, e.g., as indicated in FIG. 3B. While the outer opening portion(s) 316 are shown in FIG. 3B as having a periphery defined by rectilinear surfaces of the base structure 308, it should be understood that in various embodiments the periphery of one or more outer opening portions may be shaped differently (e.g., defined by curved surfaces, a combination of rectilinear and curved surfaces, etc.).

According to some embodiments, the cutout 314 may be a hole that has a shape that is formed from the inner opening portion (e.g., a circular or oval inner opening portion), with outer opening portion(s) 316 (e.g., rectangular outer opening portions) intersecting the inner opening portion, e.g., as indicated in FIG. 3B. In some embodiments, the outer opening portion(s) 316 may individually be sized and/or shaped to accommodate a respective protrusion 318 and/or a respective probe magnet 320. For example, an individual outer opening portion 316 may be configured such that a respective protrusion 316 may extend, in the Z-axis direction, past at least a portion of the base structure 308. In some embodiments, the inner opening portion and an outer opening portion 316 may collectively be sized and/or shaped to accommodate a respective protrusion 318 and/or a respective probe magnet 320. For example, a protrusion 318 may extend through a region (of the cutout 314) that is defined partially by an outer opening portion 316 (e.g., a rectangular outer opening portion that intersects the inner opening portion) and partially by the inner opening portion.

In other embodiments, a base structure may include one or more cutouts that accommodate respective protrusions and/or respective probe magnets, and those cutouts may be separate openings from a cutout configured to allow light to pass through the base structure to the image sensor. For example, as indicated in FIG. 3C, the base structure 308c may comprise a central opening 314c and one or more cutouts 316c that do not intersect the central opening 314c. The central opening 314c may be configured to allow light to reach the image sensor. Each of the cutout(s) 316 may be configured to receive at least a portion of a respective protrusion 318 of the lens carrier 306 and/or at least a portion of a respective probe magnet 320 (which may be attached to the respective protrusion 318). The cutout(s) 316c may be positioned (e.g., in the Y-axis direction) between the central opening 314c and a respective side of the camera 300 in some embodiments.

In some embodiments, a central opening itself may be a cutout configured to allow light to reach the image sensor and accommodate the protrusion(s) and/or the probe magnet(s). In FIG. 3C, for example, instead of having the central opening 314c and separate cutout(s) 316c, the base structure 308c may have a cutout 314c' that is sized to allow light to reach the image sensor and accommodate the protrusion(s) 318 of the lens carrier 306 and/or the probe magnet(s) 320. The cutout 314c' shown in FIG. 3C is circular, but may be shaped differently in various embodiments. For example, in some embodiments the cutout 314c' may be a curved shape (e.g., a circle, an oval, etc.), a polygon shape (e.g., hexagon, octagon, etc.), a freeform shape, and/or a hybrid shape that combines multiple types of shapes (e.g., a shape comprising a rectilinear portion and a curved portion).

Figure 4:
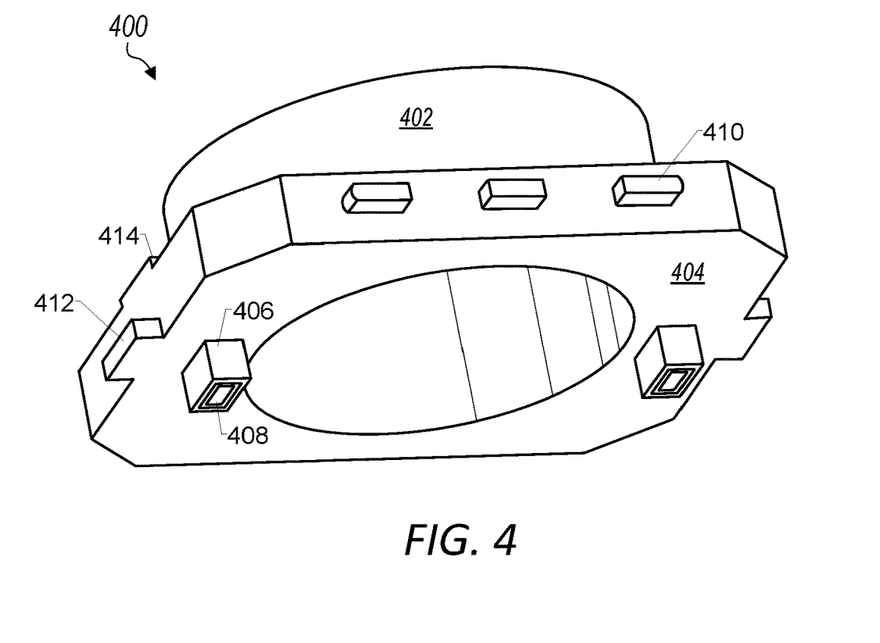
FIG. 4 illustrates a perspective view of an example lens carrier that includes one or more protrusions to which a portion of a position sensing arrangement may be attached, in accordance with some embodiments.

FIG. 4 illustrates a perspective view of an example lens carrier 400 that includes one or more protrusions to which a portion of a position sensing arrangement may be attached. In some embodiments, the lens carrier 400 may be the same as, or similar to, the lens carrier 108 in FIG. 1, the lens carrier 208 in FIGS. 2A-2B, and/or the lens carrier 306 in FIGS. 3A-3B.

In some embodiments, the lens carrier 400 may include an upper portion 402 and a lower portion 404. The upper portion 402 and the lower portion 404 may have one or more shared interior surfaces that at least partially encircle a lens group (e.g., lens group 102 in FIG. 1) and/or a lens barrel (e.g., lens barrel 120 in FIG. 1). In some embodiments, the lower portion 404 may extend outwardly (e.g., along the X-Y plane) relative to the upper portion 402, e.g., as indicated in FIG. 4.

According to some embodiments, the lens carrier 400 may include one or more protrusions 406 that extend downwardly (e.g., in the Z-axis direction) from the lower portion 404 (e.g., from a bottom surface of the lower portion 404 towards a substrate (e.g., substrate 106 in FIG. 1). One or more probe magnets 408 may be attached to the protrusion(s) 406. In some embodiments, a probe magnet 408 may be at least partially embedded within a protrusion 406.

In some embodiments, the lens carrier 400 may include one or more coil holder portion(s) 410. For example, as discussed herein with reference to FIG. 6, one or more coils of a voice coil motor (VCM) actuator may be attached to the lens carrier 400. The coil holder portion(s) 410 may be configured to fixedly couple with such coil(s). In some embodiments, the coil holder portion(s) 410 may extend from opposite sides of the lens carrier 400. For example, the coil holder portions 410 shown in FIG. 4 may extend from a first side of the lens carrier 400 to hold a coil (e.g., coil 612 in FIG. 6) of a first magnet-coil group of the VCM actuator, and additional coil holder portion(s) 410 may extend from a second side (opposite the first side) of the lens carrier 400 to hold a coil of a second magnet-coil group of the VCM actuator.

In some embodiments, the lens carrier 400 may include one or more end stop bumpers configured to limit or prevent portions of the lens carrier from colliding against one or more stationary components (e.g., a shield can) in one or more directions, e.g., in a drop event. For example, the end stop bumper(s) may include one or more horizontal bumpers 412 and/or one or more vertical bumpers 414. The horizontal bumper(s) 412 may extend in a direction orthogonal to the optical axis, and the vertical bumper(s) 414 may extend in a direction parallel to the optical axis, e.g., as indicated in FIG. 4. In some embodiments, the end stop bumper(s) may be configured to cushion motion of the lens carrier 400 as it approaches an interior surface (of a stationary structure) that defines an end stop.

Figure 5:
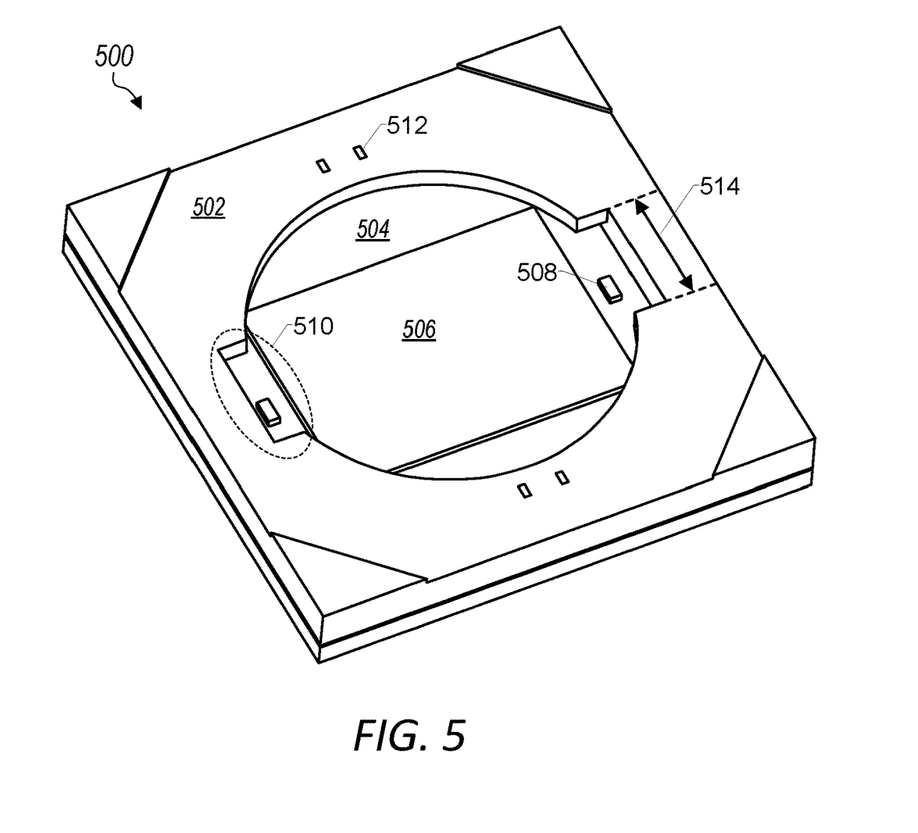
FIG. 5 illustrates a perspective view of some example components of a lower portion of a camera that includes one or more base cutouts for a position sensing arrangement, in accordance with some embodiments.

FIG. 5 illustrates a perspective view of some example components 500 of a lower portion of a camera (e.g., camera 100 in FIG. 1, camera 200 in FIGS. 2A-2B, camera 300 in FIGS. 3A-3B, and/or imaging system 600 in FIG. 6, etc.) that includes one or more base cutouts for a position sensing arrangement. In some embodiments, the components 500 may include a base structure 502, a substrate 504, an image sensor 506, one or more position sensors 508, one or more cutouts (e.g., comprising outer opening portions 510), and/or one or more electrical traces 512. According to some examples, the base structure 502, the substrate 504, the image sensor 506, the position sensor(s) 508, and/or the cutout(s), respectively, may be the same as, or similar to, the base structure 110, the substrate 106, the image sensor 104, the position sensor(s) 114, and/or the cutout(s) of FIG. 1.

In some embodiments, the base structure 502 may comprise electrical trace(s) 512 in some embodiments. The electrical trace(s) 502 may form a portion of an electrical path used to convey drive current to one or more coils (e.g., coil 612 in FIG. 6) of an actuator (e.g., actuator 610 in FIG. 6). In a non-limiting example, current may flow in the electrical path from the substrate 504 to the coil(s) via the electrical trace(s) 512 of the base structure 502. In some embodiments, the electrical trace(s) 512 may bridge the electrical path from the substrate 504 to one or more springs of a suspension arrangement (e.g., lower leaf spring 130 in FIG. 1), which in turn may convey the current to the coil(s) and/or a lens carrier (e.g., lens carrier 108 in FIG. 1) to which the coil(s) may be attached, so as to supply the drive current to the coil(s).

According to some embodiments, the base structure 502 may include multiple separate pieces, e.g., instead of being a singular component. As a non-limiting example, the outer opening portion(s) 510 of the cutout shown in FIG. 5 may be extended by removal of example region 514. Removal of the region 514 at opposite sides of the base structure 502, for example, may form a base structure 502 that comprises two pieces that are separated from each other.

Figure 6:
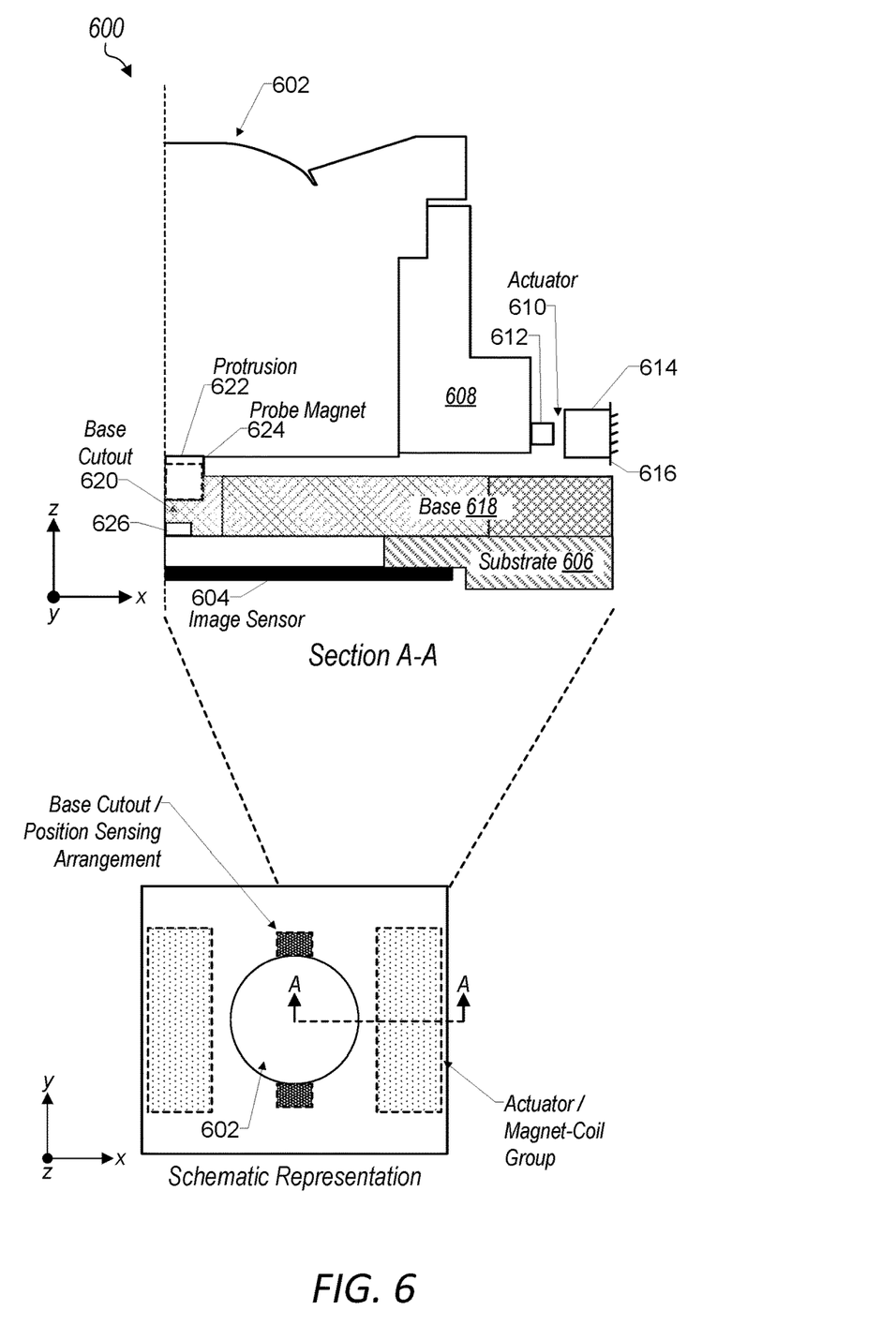
FIG. 6 illustrates a partial cross-sectional view of an example imaging system having an actuator and one or more base cutouts for a position sensing arrangement, in accordance with some embodiments.

FIG. 6 illustrates a partial cross-sectional view of an example imaging system 600 (e.g., a camera) having an actuator and one or more base cutouts for a position sensing arrangement. FIG. 6 includes a schematic representation generally illustrating example positioning of actuator components relative to position sensing components according to some examples. In some embodiments, the cross-sectional view labeled "Section A-A" at the top of FIG. 6 may correspond to a cross section taken at a location indicated by section line A-A shown in the schematic representation at the bottom of FIG. 6.

In some embodiments, the imaging system 600 may include one or more optical elements 602 (e.g., comprising one or more lenses, prisms, and/or reflective elements, etc.), an image sensor 604, a substrate 606, a moveable carrier 608 (e.g., a lens carrier as discussed herein with reference to FIGS. 1-4), an actuator 610 (e.g., comprising one or more coil(s) 612 and one or more magnets 614), one or more stationary structures 616, a base structure 618, one or more cutouts 620, one or more protrusions 622, one or more probe magnets 624, and/or one or more position sensors 626. According to various embodiments, the imaging system 600 may be the same as, or similar to, the cameras 100, 200, and/or 300 described herein with reference to FIGS. 1-3B. For example, the one or more optical elements 602, the image sensor 604, the substrate 606, the moveable carrier 608, the actuator 610, the base structure 618, the cutout(s) 620, the protrusion(s) 622, the probe magnet(s) 624, and/or the position sensor(s) 626, respectively, may be the same as, or similar to, the lens group 102 (and/or the optical element(s) 116), the image sensor 104, the substrate 106, the lens carrier 108, the cutout(s), the protrusion(s) 122, the probe magnet(s) 112, and/or the position sensor(s) 114 of FIG. 1.

According to various examples, the actuator 610 may comprise a voice coil motor (VCM) actuator. The VCM actuator may include one or more coils 612 and one or more magnets 614. As indicated in FIG. 6, the VCM actuator may include a first magnet-coil group (e.g., comprising a magnet 614 and a coil 612 that electromagnetically interact with each other) and/or a second magnet-coil group (not shown). For example, the first magnet-coil group may be positioned, in the X-axis direction, between the optical element(s) 602 and a first side wall of the imaging system 600. The second magnet-coil group may be positioned, in the X-axis direction, between the optical element(s) 602 and a second side wall of the imaging system 600 that is opposite the first side wall. In some non-limiting embodiments, the imaging system 600 may not have a magnet-coil group positioned in a space to a third side (e.g., no magnet-coil group positioned, in the Y-axis direction, between the optical element(s) 602 and a third side wall of the imaging system 600) and/or a fourth side (e.g., no magnet-coil group positioned, in the Y-axis direction, between the optical element(s) 602 and a fourth side wall of the imaging system 600 that is opposite the third side wall of the imaging system 600). In some embodiments, the first magnet-coil group may have a longest dimension in the Y-axis direction. Furthermore, the second magnet-coil group may have a longest dimension in the Y-axis direction. Embodiments of the cameras disclosed herein are not limited to two magnet-coil groups and/or positioning of the magnet-coil groups described with reference to FIG. 6; various embodiments may include fewer or more magnet-coil groups and/or magnet-coil groups that are positioned differently (e.g., including at different sides of the imaging system 600 and/or at different orientations, etc.).

In some embodiments, the coil(s) 612 may comprise autofocus (AF) coil(s) attached to the moveable carrier 608. The magnet(s) 614 may comprise drive magnets attached to one or more stationary structures of the imaging system 600. For example, the magnet(s) 614 may be attached to a shield can (e.g., shield can 124 in FIG. 1) and/or to the base structure 618. As discussed herein with reference to at least FIG. 1, control signals (e.g., signals associated with actuator commands from controller(s) of an ISP) may be conveyed to the coil(s) 612. For example, drive current may be supplied to the coil(s) 612 so as to cause the coil(s) 612 to electromagnetically interact with the magnetic fields produced by the magnet(s) 614, producing Lorentz forces that move the moveable carrier 608 in the Z-axis direction, e.g., to provide AF of an image on the image sensor 604. As discussed herein with reference to FIG. 5, the base structure 618 may comprise electrical traces (e.g., electrical traces 512 in FIG. 5) that may be part of an electrical path through which the drive current is conveyed. In some embodiments, the electrical traces may include an electrical trace for a positive drive signal (e.g., to move the moveable carrier 608 upwards, in the Z-axis direction, away from the image sensor 604) to a coil 612, and an electrical trace for negative drive signal (e.g., to move the moveable carrier 608 downwards, in the Z-axis direction, towards the image sensor 604) to the coil 612.

The position sensor(s) 626 may be configured to sense magnetic fields produced by the probe magnet(s) 624. For example, a position sensor 626 may detect changes in a magnetic field as a probe magnet 624 moves relative to the position senor 626 in the Z-axis direction. In some embodiments, the imaging system 600 may include one or more processors (e.g., processor(s) 702 in FIG. 7) that receive position sensor data from the position sensor(s) 626. The processor(s) may determine, based at least in part on the position sensor data, a current position of the optical element(s) 602 in the Z-axis direction. In some embodiments, the processor(s) (and/or one or more controller(s)) may determine one or more actuator control signals, e.g., focus control signal(s) for moving the optical element(s) 602 from the current position to a focus position at which the imaging system 600 is focused with respect to an image on the image sensor 604. The processor(s) may control the actuator 610 according to the one or more focus control signals, so as to cause the optical element(s) 602 to move to the focus position.

Figure 7:
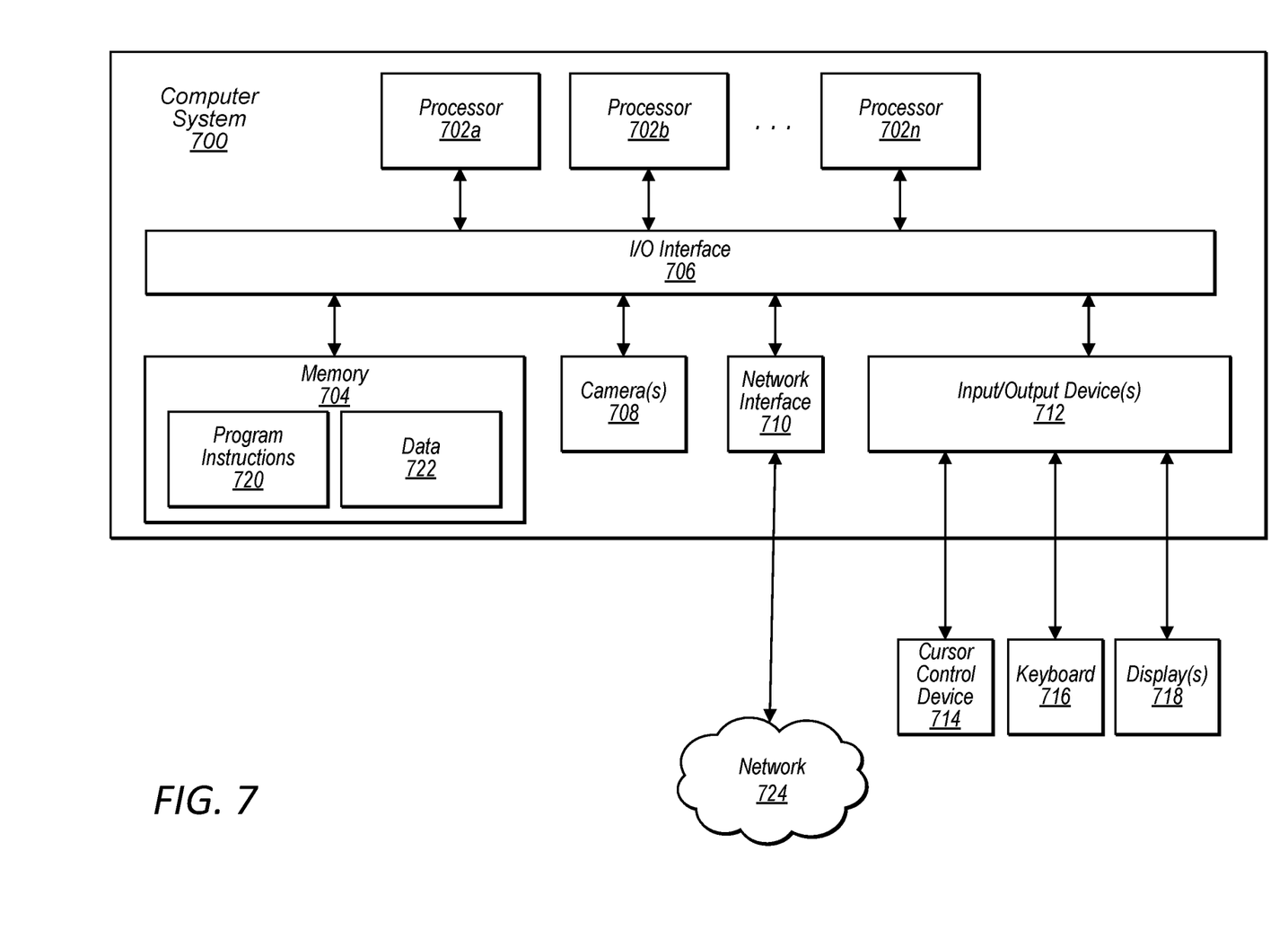
FIG. 7 illustrates an example computer system that may include a camera having one or more base cutouts for a position sensing arrangement, in accordance with some embodiments.

According to some embodiments, the imaging system 600 may comprise a camera that is included in a device (e.g., a mobile device, a mobile multi-function device, and/or one or more of the devices described herein with reference to FIG. 7, etc.). The device may include memory storing program instructions executable by the one or more processors to control operations of the camera. In some embodiments, the camera may be included in a multi-camera system. Such a system may include multiple cameras and a chassis for mounting the cameras, e.g., in a fixed position relative to one another and/or in a fixed position relative to the device. The multi-camera system may include different types of cameras (e.g., with respect to module size, lens architecture, focal length, image sensor size, actuator architecture, and/or suspension architecture, etc.) in some embodiments.

FIG. 7 illustrates an example computing device, referred to as computer system 700, that may include or host embodiments of a camera having one or more base cutouts for a position sensing arrangement, e.g., as described herein with reference to FIGS. 1-6. In addition, computer system 700 may implement methods for controlling operations of the camera and/or for performing image processing on images captured with the camera.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. In multiprocessor systems, each of processors 702 may commonly, but not necessarily, implement the same ISA.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
   a lens group comprising one or more lens elements that define an optical axis;
   a substrate;
   an image sensor attached to the substrate, the image sensor to capture image data based on light that passes through the lens group;
   an actuator to move at least one of the lens group or the image sensor;
   a base structure positioned, in a direction parallel to the optical axis, between at least a portion of the lens group and the substrate, wherein the base structure comprises a cutout;
   a lens carrier coupled with the lens group, wherein the lens carrier comprises a protrusion that extends, in the direction parallel to the optical axis, past at least a portion of the base structure via the cutout;
   a position sensor attached to the substrate; and
   a probe magnet attached to the protrusion of the lens carrier and located proximate the position sensor, such that the position sensor is capable of sensing magnetic fields of the probe magnet.

2. The camera of claim 1, wherein the probe magnet and the position sensor are positioned along an axis that extends through the cutout in the direction parallel to the optical axis.

3. The camera of claim 1, wherein the actuator comprises a voice coil motor (VCM) actuator to move the lens group, in the direction parallel to the optical axis, relative to the image sensor.

4. The camera of claim 1, wherein:
the direction parallel to the optical axis is a first direction;
the protrusion is positioned, in a second direction orthogonal to the optical axis, between the lens group and the base structure; and
the base structure and the position sensor are attached to an upper surface of the substrate.

5. The camera of claim 1, wherein the cutout comprises a space sized to accommodate an extension of the protrusion, such that, at a maximum actuator stroke in the direction parallel to the optical axis and towards the position sensor, the probe magnet is positioned between an upper surface of the base structure and an upper surface of the substrate.

6. The camera of claim 1, wherein:
the direction parallel to the optical axis is a first direction;
the cutout comprises:
an inner opening portion to allow light to reach the image sensor after the light passes through the lens group and the opening;
a first outer opening portion that extends, in a second direction orthogonal to the optical axis, between the inner opening portion and a first side wall of the camera; and
a second outer opening portion that extends, in the second direction, between the inner opening portion and a second side wall of the camera, wherein the second side wall is opposite the first side wall relative to the lens group.

7. The camera of claim 6, further comprising:
a suspension arrangement that suspends the lens carrier from the base structure and that allows movement of the lens carrier, in at least the first direction parallel to the optical axis, relative to the image sensor, wherein the suspension arrangement comprises at least one of:
an upper leaf spring that extends, along a first plane that is orthogonal to the optical axis, from the lens carrier to one or more stationary structures of the camera; and
a lower leaf spring that extends, along a second plane that is orthogonal to the optical axis, from the lens carrier to the base structure, wherein the lower leaf spring is positioned between the first plane and the substrate.

8. A device, comprising:
one or more processors;
memory storing program instructions executable by the one or more processors to control operations of a camera; and
the camera, comprising:
a lens group comprising one or more lens elements that define an optical axis;
a substrate;
an image sensor attached to the substrate, the image sensor to capture image data based on light that passes through the lens group;
an actuator to move at least one of the lens group or the image sensor;
a base structure positioned, in a direction parallel to the optical axis, between at least a portion of the lens group and the substrate, wherein the base structure comprises a cutout;
a lens carrier coupled with the lens group, wherein the lens carrier comprises a protrusion that extends, in the direction parallel to the optical axis, past at least a portion of the base structure via the cutout;
a position sensor attached to the substrate; and
a probe magnet attached to the protrusion of the lens carrier and located proximate the position sensor, such that the position sensor is capable of sensing magnetic fields of the probe magnet.

9. The device of claim 8, wherein the probe magnet and the position sensor are positioned along an axis that extends through the cutout in the direction parallel to the optical axis.

10. The device of claim 8, wherein:
the direction parallel to the optical axis is a first direction;
the protrusion is positioned, in a second direction orthogonal to the optical axis, between the lens group and the base structure; and
the base structure and the position sensor are attached to an upper surface of the substrate.

11. The device of claim 8, wherein the cutout comprises a space sized to accommodate an extension of the protrusion, such that, at a maximum actuator stroke in the direction parallel to the optical axis and towards the position sensor, the probe magnet is positioned between an upper surface of the base structure and an upper surface of the substrate.

12. The device of claim 8, wherein:
the actuator comprises a voice coil motor (VCM) actuator to move the lens group in the direction parallel to the optical axis, relative to the image sensor; and
the base structure further comprises one or more electrical traces that form a portion of an electrical path used to convey drive current to one or more coils of the VCM actuator.

13. The device of claim 12, wherein the cutout comprises:
a first portion that extends, along a first axis orthogonal to the optical axis, between the lens group and a first side wall of the camera; and
a second portion that extends, along the first axis, between the lens group and a second side wall of the camera, wherein the second side wall is opposite the first side wall relative to the lens group.

14. The device of claim 13, wherein:
the protrusion is a first protrusion;
the position sensor is a first position sensor;
the probe magnet is a first probe magnet;
the lens carrier further comprises:
a second protrusion that extends, in the direction parallel to the optical axis, past at least a portion of the base structure via the second portion; and
the camera further comprises:
a second position sensor attached to the substrate; and
a second probe magnet attached to the second protrusion of the lens carrier and located proximate the second position sensor, such that the second position sensor is capable of sensing magnetic fields of the probe magnet.

15. The device of claim 13, wherein the VCM actuator comprises:
a first magnet-coil group positioned, along a second axis orthogonal to the first axis and the optical axis, between the lens group and a third side wall of the camera, wherein the first magnet-coil group comprises a first magnet and a first coil, and wherein each of the first magnet and the first coil have a respective longest dimension that is parallel to the third side wall; and
a second magnet-coil group positioned, along the second axis, between the lens group and a fourth side wall of the camera, wherein the fourth side wall is opposite the third side wall relative to the lens group, and wherein the second magnet-coil group comprises a second magnet and a second coil.

16. An imaging system, comprising:

one or more optical elements;

a moveable carrier fixedly coupled with the one or more optical elements;

a substrate;

an image sensor attached to the substrate, the image sensor to capture image data based on light that passes through the one or more optical elements;

an actuator to move the moveable carrier, in a direction parallel to an optical axis of the imaging system, relative to the image sensor;

a base structure attached to an upper surface of the substrate, wherein the base structure comprises a cutout;

a position sensor attached to the upper surface of the substrate; and a probe magnet fixedly attached to the moveable carrier, wherein a range of motion of the probe magnet includes a path, in the direction parallel to the optical axis and via the cutout, for positioning at least a portion of the probe magnet between an upper surface of the base structure and the upper surface of the substrate, and wherein the position sensor is capable of sensing magnetic fields of the probe magnet.

17. The imaging system of claim 16, wherein:

the one or more optical elements comprise a lens that defines the optical axis; and probe magnet and the position sensor are positioned along an axis that extends through the cutout in the direction parallel to the optical axis.

18. The imaging system of claim 17, wherein the actuator comprises a voice coil motor (VCM) actuator configured to move the lens to provide autofocus of an image on the image sensor.

19. The imaging system of claim 17, further comprising:

one or more processors to:

receive position sensor data from the position sensor; and determine, based at least in part on the position sensor data, a current position of the lens in the direction parallel to the optical axis.

20. The imaging system of claim 19, wherein the one or more processors are further to:

determine one or more focus control signals for moving the lens from the current position to a focus position at which the imaging system is focused with respect to an image on the image sensor; and control the actuator according to the one or more focus control signals, so as to cause the lens to move to the focus position.

* * * * *